E. S. McKEAN.
AUTOMOBILE LOCK.
APPLICATION FILED MAR. 5, 1918.
1,296,987.
Patented Mar. 11, 1919.
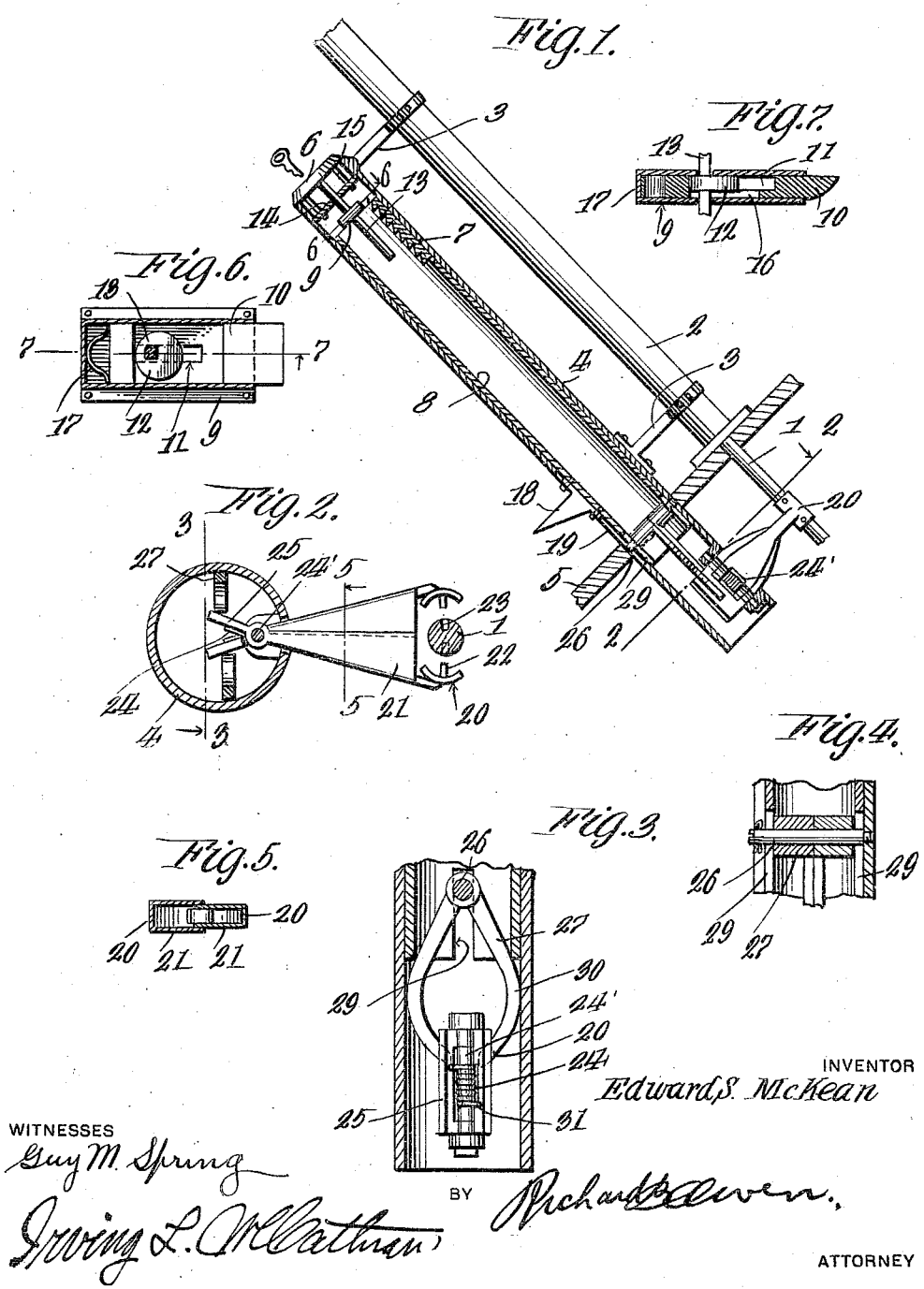
WITNESSES
Guy M. Spring
Irving L. McCathran
INVENTOR
Edward S. McKean
BY Richard B. Owen
ATTORNEY

UNITED STATES PATENT OFFICE.

EDWARD S. McKEAN, OF YONKERS, NEW YORK, ASSIGNOR OF ONE-HALF TO ANTHONY G. JACKSON, OF WASHINGTON, DISTRICT OF COLUMBIA.

AUTOMOBILE-LOCK.

1,296,987. Specification of Letters Patent. Patented Mar. 11, 1919.

Application filed March 5, 1918. Serial No. 220,517.

*To all whom it may concern:*

Be it known that I, EDWARD S. MCKEAN, a citizen of the United States, residing at Yonkers, in the county of Westchester and State of New York, have invented certain new and useful Improvements in Automobile-Locks, of which the following is a specification.

This invention relates to an automobile steering mechanism lock and has for its object the production of a simple and efficient lock for efficiently locking the steering mechanism of an automobile in order to prevent the steering mechanism from being actuated by unauthorized parties.

Another object of this invention is the production of a simple and efficient means for locking the steering mechanism of an automobile, whereby the locking means may be actuated from the seat of the vehicle.

With these and other objects in view this invention consists in certain novel constructions, combinations and arrangements of parts as will be hereinafter fully described and claimed.

In the drawings:—

Figure 1 is a vertical section through the locking means, the steering shaft being shown in side elevation.

Fig. 2 is a section taken on line 2—2 of Fig. 1.

Fig. 3 is a section taken on line 3—3 of Fig. 2.

Fig. 4 is an enlarged vertical section through the locking casing showing the clamping arms pivotally mounted upon the supporting shaft therefor.

Fig. 5 is a section taken on line 5—5 of Fig. 2.

Fig. 6 is a horizontal sectional view through the locking casing, and

Fig. 7 is a section taken on line 7—7 of Fig. 6.

By referring to the drawings it will be seen that 1 designates the steering shaft which extends through a suitable guiding tube 2. This steering shaft 1 may be connected in any suitable or desired means with the steering wheels of the vehicle and a plurality of supporting clamps 3 are clamped tightly around the tube or sleeve 2 and these clamps 3 firmly engage the outer casing 4 of the locking mechanism. The locking mechanism comprises an elongated outer casing 4 and this casing projects both above and below the floor 5 of the vehicle. A suitable lock 6, preferably of the pin type or other locks of similar construction is carried by the upper end of the outer casing 4 as shown in Fig. 1 of the drawings. The outer casing 4 is provided with a rack 7, which rack is fixedly secured to the inner face of the outer casing 4 as shown in Fig. 1. An inner sleeve 8 is slidably mounted within the outer casing 4 as shown in Fig. 1 and this sleeve 8 carries a latching casing 9 at the upper end thereof, which latching casing 9 is adapted to freely move with the inner sleeve 8.

The latching casing 9 carries a sliding latching bolt 10, which sliding latching bolt 10 is provided with a pocket 11 formed in the upper face thereof, this pocket 11 receiving an eccentric wheel or disk 12, the eccentric disk or wheel 12 being carried by the controlling bolt 13, this controlling bolt being actuated by the lock 6. The bolt 13 may be actuated in any suitable or desired means by the lock 6, and in view of the fact that the construction of the lock 6 is not material to the present invention, it is thought unnecessary to go into detail in either the description or illustration of this portion of the invention. The bolt 13 is preferably square in cross section but is so mounted within the eccentrically mounted wheel 12 as to permit the bolt 13 to freely move longitudinally through this wheel 12 as will be clearly understood by considering Figs. 1 and 7 of the drawing. This bolt 13 is also guided through the guiding bracket 14 carried by the outer casing 4, and this guiding bracket 14 is preferably spaced from the upper end of the casing 4 by means of suitable spacing bolts 15 shown in Fig. 1. The bolt 10 of the latching member is provided with a longitudinally extending slot 16, through which slot 16 extends the bolt 13 in order to permit the latching bolt 10 to freely slide within the casing 9, while the eccentrically mounted disk or wheel 12 is rotated within the pocket 11. A suitable spring 17 is carried in the rear end of the casing 9 and engages the rear end of the bolt 10 for normally urging the same outwardly and thereby permitting the outer end of the latching bolt 10 to freely engage the ratchet teeth 7 formed upon the inner face of the outer casing 4. It will therefore be seen that as the inner casing 8 is forced downwardly the outer end of the bolt 10 will firmly engage the ratchet teeth 7 and thereby lock the inner casing 8 in a set position relative to the outer casing 4.

A treadle plate 18 is secured to the inner casing 8, and this treadle plate 18 extends through the longitudinally extending slot 19 formed in the outer casing 4 as shown in Fig. 1. It will therefore be seen that the operator may place his foot upon the treadle plate 18, and by forcing the same downwardly, the inner casing 8 will be moved downwardly and the latching bolt 10 will be caused to register with the ratchet teeth 7 and thereby firmly hold the inner casing 8 in a set position.

A pair of gripping jaws 20 are pivotally mounted upon the lower end of the outer casing 4 as shown in Figs. 1 and 2 and these jaws 20 are provided with overhanging or overlapping web portions 21 as shown in Figs. 2 and 5. The jaws 20 are adapted to be forced toward each other and these jaws 20 are provided with inwardly extending lugs 22, these lugs 22 being adapted to fit within the socket 23 formed in the sides of the steering rod 1. A suitable spring 24 is placed between the rearwardly extending flanges 25 of the jaws 20 and this spring is adapted to firmly hold the jaws 20 in firm engagement with the steering rod 1. It will be seen by considering Fig. 2, that the overlapping web portions 21 will constitute an efficient means for preventing a large ejecting or spreading tube from being inserted between the jaws for the purpose of forcing the same apart and unlocking the device.

The inner casing 8 is provided with a transversely extending supporting bolt or shaft 26 and a pair of locking jaws 27 are journaled upon this bolt 26. These locking jaws 27 are bowed outwardly and are provided with inwardly extending ends 28, these inwardly extending ends 28 being adapted to rest against the outer face of the flanges 25 of the jaws 20. The bolt 26 extends through the longitudinally extending slots 29 formed in the inner casing 8 and the respective ends of the bolt 26 are firmly secured to the outer casing 4, one end of the bolt 26 being threaded into a threaded socket formed in the outer casing 4, and the other end of the bolt resting within the slot 19 formed in the outer casing 4.

By considering Fig. 3 it will be seen that as the inner casing 8 is forced downwardly, the lower end of this inner casing 8 will engage the bowed or outwardly bowed portion 30 of the arms 27 and cause the inner ends 28 to firmly bind against the inwardly extending flanges 25 of the jaws 20 and thereby cause the outer ends of the jaws to be firmly moved in engagement with the steering rod 1 and cause the lug 22 to fit within the socket 23 of the steering rod 1. It of course should be understood that the coil spring 24 which is mounted upon the supporting or pivot bolt 24' is provided with projecting ends 31 which projecting ends engage the inner face of the extending flanges 25 and force the flanges 25 apart and consequently open the jaws 20 as soon as the arms 27 are released from engagement with the rearwardly extending flange portions 25 of the jaws 20.

From the foregoing description it will be seen that a very simple and efficient means has been produced for the purpose of locking the steering rod of a vehicle without the necessity of the operator dismounting from the steering seat. The operator may merely release the lock 6 and force downwardly upon the foot treadle 18, thereby forcing the inner tube 8 downwardly and drawing the arms 27 together, in this manner forcing the jaws 20 in firm engagement with the steering rod 1. When it is desired to release the lock, the lock 6 may be released thereby drawing the latching bolt 10 out of engagement with the casing 9 and permitting the spring 24 to spread the flanges 25 apart and thereby move the jaws 20 to an open position.

It of course should be understood that certain detail mechanical changes may be made in the present invention without departing from the spirit thereof, so long as these changes fall within the scope of the appended claims.

What is claimed is:—

1. A locking device of the class described comprising a steering rod, gripping jaws adapted to engage the same, a supporting casing for said gripping jaws, a sleeve slidably mounted within said supporting casing, said jaws provided with inwardly extending flanges, arms pivotally mounted within said casing and provided with outwardly bulged portions, the lower ends of said arms engaging said flange portion of said jaws, the lower end of said sleeve engaging said bulged portions of said arms for forcing said arms together and consequently causing said jaws to be firmly bound in engagement with said steering rod, and means for locking said sleeve in a set position within said supporting member.

2. A locking device of the class described comprising a steering rod, gripping jaws adapted to engage the same, a supporting casing for said gripping jaws, a sleeve slidably mounted within said supporting casing, said jaws provided with inwardly extending flanges, arms pivotally mounted within said casing and provided with outwardly bulged portions, the lower ends of said arms engaging said flange portion of said jaws, the lower end of said sleeve engaging said bulged portions of said arms for forcing said arms together and consequently causing said jaws to be firmly bound in engagement with said steering rod, a series of teeth formed upon the inner face of said supporting member, and a latching means carried by said sleeve and engaging said teeth for holding said sleeve in a set position within said supporting member.

3. A locking device of the class described comprising a steering rod, gripping jaws adapted to engage the same, a supporting casing for said gripping jaws, a sleeve slidably mounted within said supporting casing, said jaws provided with inwardly extending flanges, arms pivotally mounted within said casing and provided with outwardly bulged portions, the lower ends of said arms engaging said flange portion of said jaws, the lower end of said sleeve engaging said bulged portions of said arms for forcing said arms together and consequently causing said jaws to be firmly bound in engagement with said steering rod, a series of teeth formed upon said supporting member, a latching casing carried by said sleeve, a sliding bolt carried by said latching casing, a lock for controlling the operation of said sliding bolt, an eccentric wheel carried by said sliding bolt, a spring for normally urging said sliding bolt in an extended position, said eccentric wheel adapted to withdraw said latching bolt within said casing, and means projecting beyond said supporting member for facilitating the moving of said sleeve downwardly.

4. A locking device of the class described comprising a steering rod, gripping jaws adapted to engage the steering rod, a supporting casing for said gripping jaws, said jaws provided with inwardly extending flanges, arms pivotally mounted within said casing and provided with outwardly bulged portions, the lower ends of said arms engaging said flange portion of said jaws, means engaging said bulged portions of said arms for forcing said arms together and consequently causing said jaws to be firmly bound into engagement with said steering rod, and means for locking said arm gripping means in a set position within said supporting member.

5. A locking device of the class described comprising a steering rod, gripping jaws adapted to engage the same, a supporting member for said gripping jaws, arms pivotally mounted within said supporting member and provided with outwardly bulged portions, the lower ends of said arms engaging said jaws, the lower ends of said arms being inwardly bowed, means adapted to slide over said arms for forcing the same together whereby said jaws will be forced apart, and means for locking said arm engaging means in a set position against movement upon said arms thereby preventing the spreading of said arms after the same have once been forced to a set position.

6. A locking device of the class described comprising a steering rod, gripping jaws adapted to engage the same, a supporting casing for said gripping jaws, a sleeve slidably mounted within said supporting casing, arms pivotally mounted within said casing and provided with means adapted to be engaged by said sleeve whereby said arms may be swung together as said sleeve is reciprocated within said casing, said jaws provided with arm engaging means whereby the opening and closing of said arms may be controlled, a series of teeth formed upon the inner face of said supporting member, a sliding bolt carried by said sleeve and adapted to engage said teeth for holding said sleeve in a set position within said casing, a lock for controlling the operation of said sliding bolt, said casing provided with a vertically extending slot upon the rear face thereof, a treadle plate carried by said sleeve and projecting through said slot for facilitating the reciprocation of said sleeve within said casing after said sliding bolt is drawn out of engagement with said teeth, and means carried by said gripping jaws for preventing the spreading of said jaws apart by unauthorized tampering.

In testimony whereof I affix my signature in presence of two witnesses.

EDWARD S. McKEAN.

Witnesses:
ANTHONY GILBERT JACKSON,
FRANK E. RYER.

Copies of this patent may be obtained for five cents each, by addressing the "Commissioner of Patents, Washington, D. C."